US012121756B2

(12) United States Patent
Mauthner

(10) Patent No.: US 12,121,756 B2
(45) Date of Patent: Oct. 22, 2024

(54) SELF-LOCKING ESCAPE DESCENT CONTROL DEVICE

(71) Applicant: Basecamp Innovations Ltd., Invermere (CA)

(72) Inventor: Kirk M. Mauthner, Invermere (CA)

(73) Assignee: Basecamp Innovations Ltd., Invermere (CA)

( * ) Notice: Subject to any disclaimer, the term of this patent is extended or adjusted under 35 U.S.C. 154(b) by 832 days.

(21) Appl. No.: 17/320,849

(22) Filed: May 14, 2021

(65) Prior Publication Data

US 2022/0023673 A1 Jan. 27, 2022

Related U.S. Application Data

(60) Provisional application No. 63/056,801, filed on Jul. 27, 2020.

(51) Int. Cl.
*A62B 1/14* (2006.01)

(52) U.S. Cl.
CPC .................................... *A62B 1/14* (2013.01)

(58) Field of Classification Search
CPC .............. A62B 1/14; A62B 1/06; A63B 29/02
USPC .................................................. 182/192
See application file for complete search history.

(56) References Cited

U.S. PATENT DOCUMENTS

| | | | | |
|---|---|---|---|---|
| 5,544,723 A * | 8/1996 | Gettemy | A62B 1/14 188/65.1 |
| 6,029,777 A * | 2/2000 | Rogelja | A62B 1/14 182/5 |
| 8,651,235 B2 * | 2/2014 | Wood | A62B 35/0025 182/5 |
| 9,205,285 B2 * | 12/2015 | Jones | A62B 35/0018 |
| 10,918,892 B2 * | 2/2021 | Dickson | A62B 1/14 |
| 11,198,026 B2 * | 12/2021 | Bogardus, Jr. | E06C 7/186 |
| 2019/0351264 A1 * | 11/2019 | Ratalino | A62B 1/14 |

FOREIGN PATENT DOCUMENTS

AU 2018101477 A4 * 11/2018

* cited by examiner

*Primary Examiner* — Daniel J Troy
*Assistant Examiner* — Susan M. Heschel
(74) *Attorney, Agent, or Firm* — Kyle R Satterthwaite; Ryan W Dupuis; Ade & Company Inc.

(57) ABSTRACT

A self-locking descent control device features a clamp body, a handle lever pivotably coupled to the clamp body near a proximal end of the lever, an attachment point carried on the clamp body for connection to body-worn equipment of a user, a friction arrangement on the clamp body at a location across the elongated lever from the attachment point, and featuring a first set of rope passages. A second set of rope passages are laid out in series on the lever, and a clamping surface on the clamping body is positioned adjacent the proximal end of the lever on the same side thereof as the attachment point. The rope is routed on a serpentine path through the first and second sets of rope passages, and onward through a space between the proximal end of the lever and the clamping surface, whereby the user's body weight automatically clamps the rope therebetween.

15 Claims, 7 Drawing Sheets

SELF-LOCKING ESCAPE DESCENT CONTROL DEVICE

CROSS-REFERENCE TO RELATED APPLICATIONS

This application claims foreign priority benefit under 35 U.S.C. 119(e) of U.S. Provisional Patent Application No. 63/056,801, filed Jul. 27, 2020, the entirety of which is incorporated herein by reference.

FIELD OF THE INVENTION

The present invention relates generally to self-locking descenders used to descend down a rope on a user-borne belt or harness.

BACKGROUND

Descenders are devices used to safely descend down a slope or vertical face of a landmass or structure using a rope whose upper end has been sturdily anchored to bear the weight of the user. A user-borne harness or belt is clipped to the descender, which conventionally employs a rotating cam arrangement through which the rope is routed in such a way that the body weight of the user causes the rope to be pinched by the camming action, thus self-locking the descender to the rope at any given position therealong. Descent along the rope is only allowed when the user actuates a release handle that backs-off the camming action so the user's body weight will gravitationally lower the user along the rope.

The Phoenix Escape System by Rescue Products International, Inc. employs a different descender design, where instead of pinching the rope in a rotating cam arrangement, the rope is wound in an S-shaped path around two bobbins of an elongated handle that is pivotally pinned to a smaller clamping body to which the user-bone harness is clipped. The rope passes through a space between the handle and the clamping body, where the rope is normally pinched under the action of the user's body weight. Only once a far end of the handle is pulled down will the pinching force be reduced to allow user-descent along the rope.

While this particular product represents the most comparable art known to the Applicant, it lacks novel features of Applicant's unique descender design, the details of which are disclosed hereinafter.

SUMMARY OF THE INVENTION

According to one aspect of the invention, there is provided a self-locking descent control device for controlled descent of a user along a rope, said device comprising:

- a clamp body;
- a control handle comprising an elongated lever having a proximal end and an opposing distal end spaced apart on a longitudinal axis of said elongated lever, said elongated lever being pivotally coupled to the clamp body at a pivot point near the proximal end of the lever;
- an attachment point carried on the clamp body and configured for connection thereof to body-worn equipment of the user for the purpose of bearing a body weight of the user on the rope when the device is in a locked condition;
- a friction arrangement carried on the clamp body at a location across the elongated lever from the attachment point, and comprising a first set of one or more rope passages through which the rope is routable;
- a second set of rope passages opening through said elongated lever and laid out in series with one another along said longitudinal axis, said second set of rope passages comprising a proximal rope passage residing at a proximal portion of the lever between the proximal end thereof and the pivot point, and a distal subset of rope passages residing at a distal portion of the lever between the distal end thereof and the pivot point; and
- a clamping surface on the clamping body that is positioned adjacent the proximal portion of the elongated lever on the same side thereof as the attachment point;
- wherein the rope is routable on a serpentine path through the first set of one or more rope passages, and onward therefrom through the second set of rope passages, from the proximal rope passage of which the rope passes through a space between the proximal portion of the elongated lever and the clamping surface to achieve automatic clamping of the rope therebetween under the body of weight of the user, thereby placing said device in said locked condition.

According to another aspect of the invention, there is provided a self-locking descent control device for controlled descent of a user along a rope, said device comprising:

- a clamp body;
- a control handle comprising an elongated lever having a proximal end and an opposing distal end spaced apart on a longitudinal axis of said elongated lever, said elongated lever being pivotally coupled to the clamp body at a pivot point near the proximal end of the lever;
- an attachment point carried on the clamp body and configured for connection thereof to body-worn equipment of the user for the purpose of bearing a body weight of the user on the rope when the device is in a locked condition;
- a set of rope passages opening through said elongated lever and laid out in series with one another along said longitudinal axis, said set of rope passages comprising a proximal rope passage residing at a proximal portion of the lever between the proximal end thereof and the pivot point, and a distal subset of rope passages residing at a distal portion of the lever between the distal end thereof and the pivot point; and
- a clamping surface on the clamping body that is positioned adjacent the proximal portion of the elongated lever on the same side thereof as the attachment point, whereby the rope is routable on a serpentine path through the set of rope passages, and onward from the proximal rope passage thereof through a space between the proximal portion of the elongated lever and the clamping surface to achieve automatic clamping of the rope therebetween under the body of weight of the user, thereby placing said device in said locked condition;
- wherein the clamp body comprises a tapered notch situated proximate to both the clamping surface and the proximal portion of the elongated lever to define a departure point through which the rope exits the clamp body, and at which the rope is wedged into a narrowed region of the tapered notch when clamped by the proximal portion of the elongated lever.

According to yet another aspect of the invention, there is provided self-locking descent control device for controlled descent of a user along a rope, said device comprising:

- a clamp body;
- a control handle comprising an elongated lever having a proximal end and an opposing distal end spaced apart on a longitudinal axis of said elongated lever, said elongated lever being pivotally coupled to the clamp body at a pivot point near the proximal end of the lever;

an attachment point carried on the clamp body and configured for connection thereof to body-worn equipment of the user for the purpose of bearing a body weight of the user on the rope when the device is in a locked condition;

a set of rope passages opening through said elongated lever and laid out in series with one another along said longitudinal axis, said set of rope passages comprising a proximal rope passage residing at a proximal portion of the lever between the proximal end thereof and the pivot point, and a distal subset of rope passages residing at a distal portion of the lever between the distal end thereof and the pivot point; and a clamping surface on the clamping body that is positioned adjacent the proximal portion of the elongated lever on the same side thereof as the attachment point, whereby the rope is routable on a serpentine path through the set of rope passages, and onward from the proximal rope passage thereof through a space between the proximal portion of the elongated lever and the clamping surface to achieve automatic clamping of the rope therebetween under the body of weight of the user, thereby placing said device in said locked condition;

wherein the handle further comprises a movable extension coupled to the elongated lever and movable relative thereto between a working position extending an effective length of the control handle for use, and a stowed position reducing the effective length of the control handle for compact stowage between uses.

BRIEF DESCRIPTION OF THE DRAWINGS

One embodiment of the invention will now be described in conjunction with the accompanying drawings in which.

DETAILED DESCRIPTION

Figure 1:
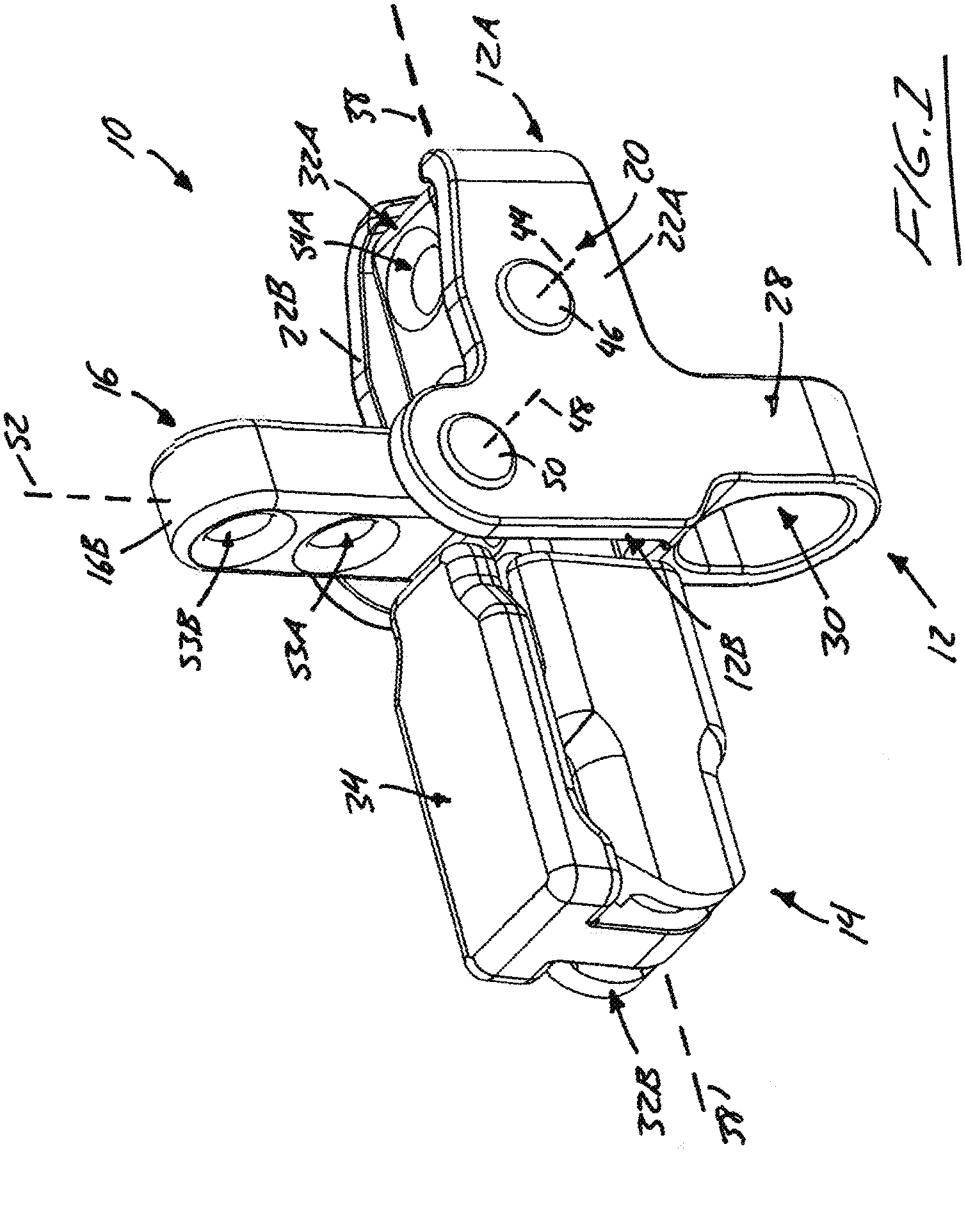
FIG. 1 is a perspective view of a descender of the present invention in a partially collapsed state reducing an effective handle length thereof for compact stowage between uses.

The drawings illustrate one embodiment of a self-locking descender 10 according to the present invention, which has three primary components: a main clamp body 12, a handle 14, and a friction member 16. These primary components are co-operably assembled into a singular unit for controlling a user's descent down a rope 18, whose upper end is anchored to a sufficiently stable structure, fixture or other anchoring point. The clamp body 12 features a channel-like upper portion 20 having two side walls 22A, 22B of matching shape and parallel and opposing relation to one another. A floor 24 of the channel-like upper portion 20 spans between the two side walls 22A, 22B in perpendicular relation thereto at bottom ends thereof. The side-walls 22A, 22B and floor 24 of the channel co-operably delimit an interior space of the clamp body 12 between them.

Figure 4:
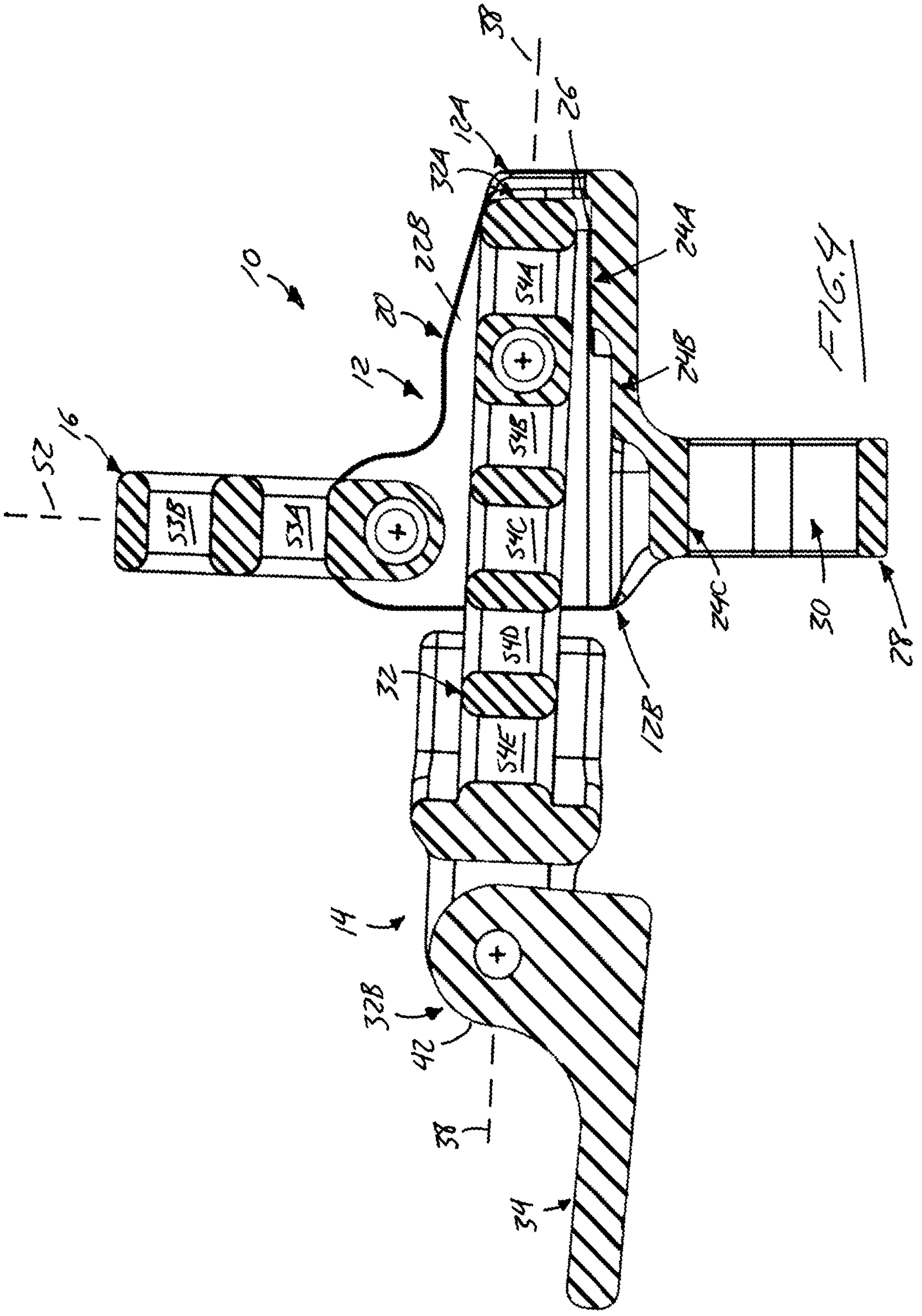
FIG. 4 is a cross-sectional view of the descender of FIG. 2 as viewed along line A-A thereof.

As revealed in the cross-sectional view of FIG. 4, the floor 24 of the channel-like upper portion 20 may have a stepped shape comprising multiple floor sections, each residing at a different elevation, and of which a proximal floor section 24A nearest to a proximal end 12A of the clamp body 12 has a greatest elevation of the different floor sections 24A, 24B, 24C. As described in more detail further below, the topside of the floor's proximal section 24A defines a clamping surface 26 against which the rope 18 is automatically clamped during use of the descender. A distal floor section 24C resides furthest from the proximal floor section 24A at a distal end 12B of the clamp 12 that opposes the proximal end 12A thereof in a longitudinal reference direction. The distal floor section 24C has the lowest elevation of the floor sections, of which an intermediate floor section 24B resides between the proximal and distal floor sections and has an intermediary elevation relative thereto.

A lower portion 28 of the clamp body 12 depends downwardly from the channel-like upper portion 20 at a location beneath the distal floor section 24C thereof at or near the distal end 12B of the clamp body 12, and features a through-bore 30 for defining an attachment point where the clamp body is connectable to body-worn equipment borne by the user. For example, a sling, snap link, carabiner or other suitable coupler attached to a harness or belt worn on the user's body can be clipped to the clamp body through the bore 30 in order to connect the descender to the user's body. While in the illustrated example this through-bore 30 opens through the lower portion 28 of the clamp body 12 in the longitudinal reference direction in which the proximal and distal ends 12A, 12B of the clamp body are spaced, it may alternatively open through the lower portion of the clamp body 12 in a lateral direction that is oriented perpendicularly transverse to the longitudinal direction, and in which the two side walls 22A, 22B of the channel-like upper portion are spaced apart.

Figure 2:
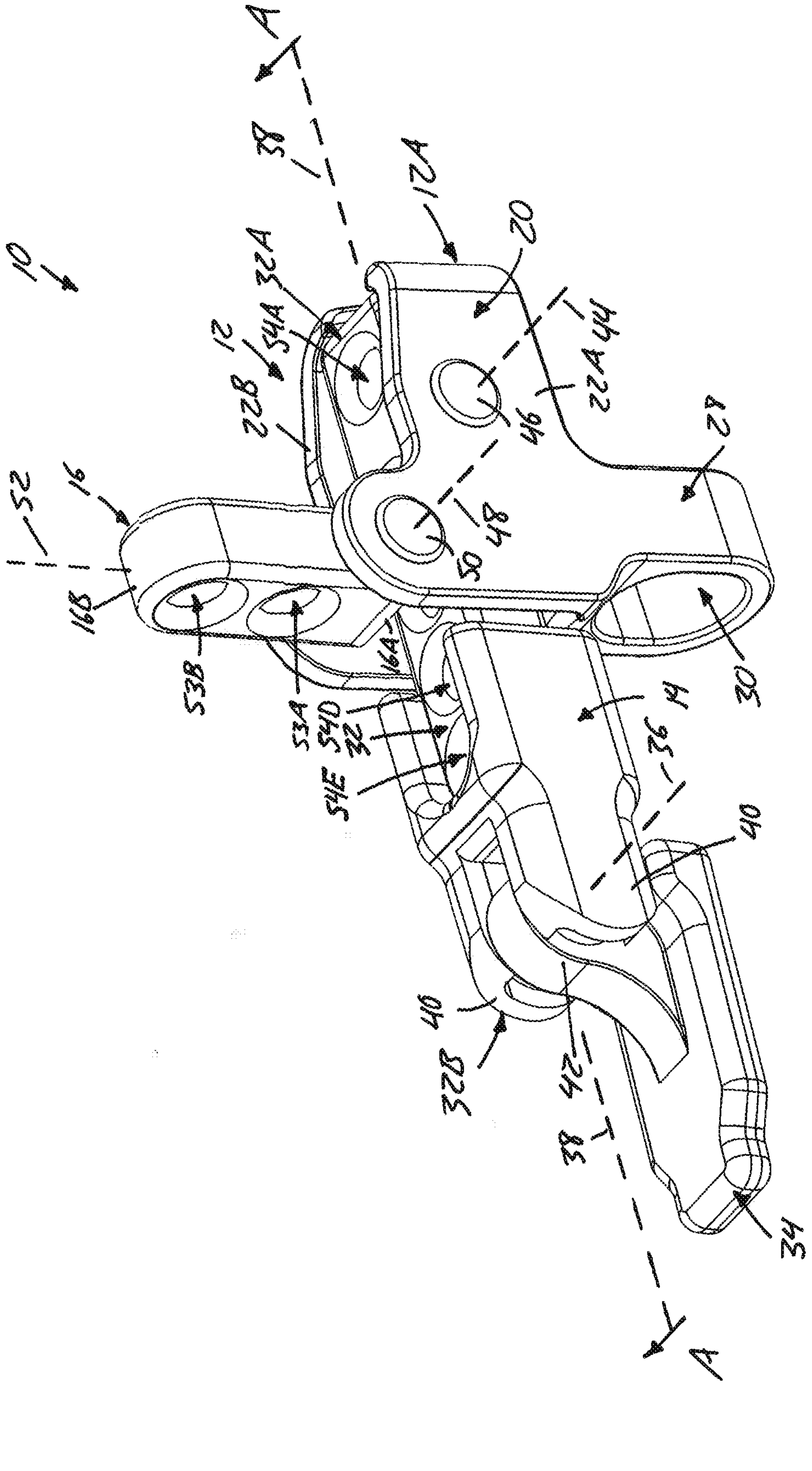
FIG. 2 is a perspective view of the descender of FIG. 1 in a fully expanded state ready for use, with the effective handle length at its maximum.
Figure 3:
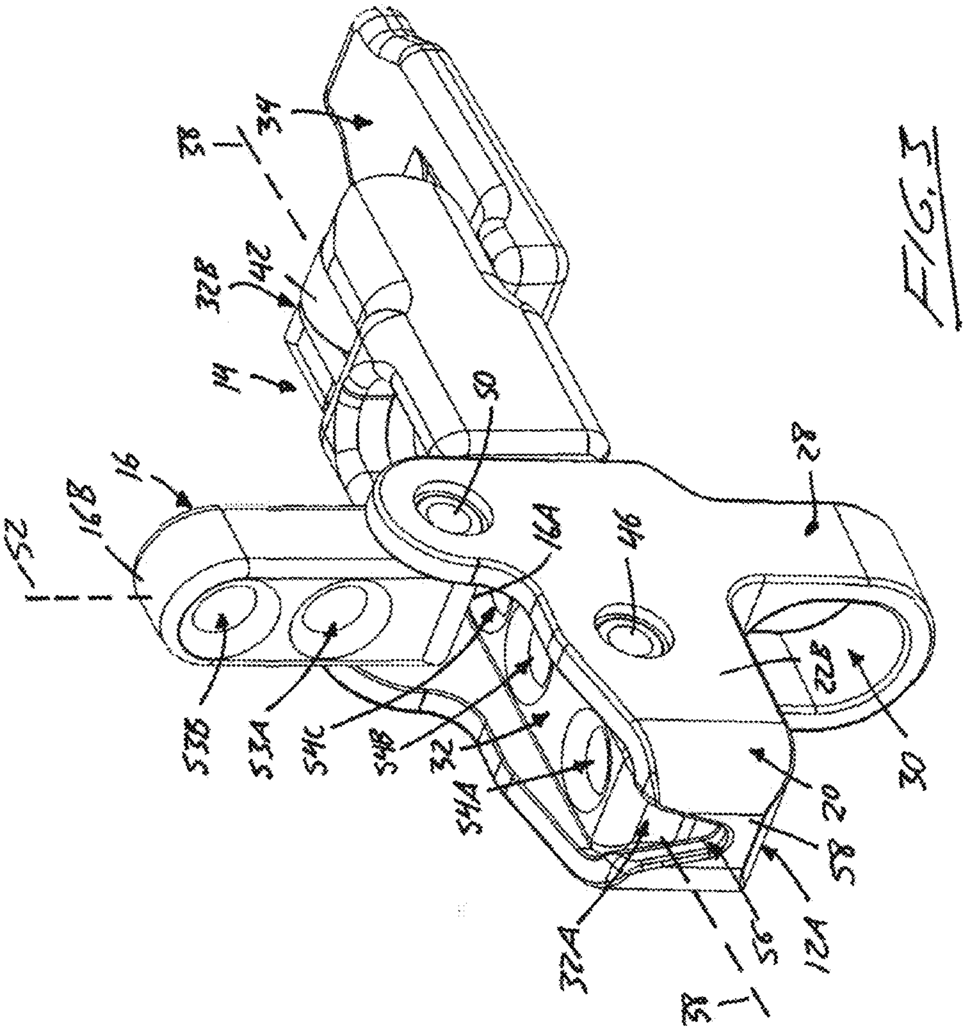
FIG. 3 is another perspective view of the descender of FIG. 2, but from an opposing end thereof.

The handle 14 is composed primarily of an elongated lever 32 having a proximal end 32A disposed in the internal space of the clamp body's channel-like upper portion 20 between the two sidewalls 22A, 22B thereof near the proximal end 12A of the clamp body. The elongated lever 32 has a longitudinally opposing distal end 32B that resides outside clamp body 12 beyond the distal end 12B thereof. In the illustrated embodiment, the handle 14 is further composed of a movable handle extension 34 that is pivotally coupled to the elongated lever 32 at or near the distal end 32B thereof. The extension 34 is pivotable about a handle-extension pivot axis 36 that lies perpendicularly transverse to a longitudinal axis 38 on which the proximal end distal ends 32A, 32B of the elongated lever 32 are spaced apart. The handle extension 34 is pivotable between a working position protruding longitudinally from the distal end 32B of the elongated lever 32, as shown in FIGS. 2 to 4; and a stowed position folded flat against the elongated lever 32 at the portion thereof that protrudes out from the distal end 12B of the clamp body 12, as shown in FIG. 1. The working position of the handle extension 34 thus extends the overall effective length of the handle 14 for functional purpose during use of the descender. By contrast, the stowed position reduces the overall effective length of the handle 14, thus helping collapse the overall size of the descender for more compact stowage thereof between uses. In the illustrated example, the distal end 32B of the elongated lever 32 is bifurcated to form a pair of ears 40 between which a lug 42 of the handle extension 34 is received and pivotally supported. It will be appreciated however that the particular details of the pivotal connection between the elongated lever 32 and the handle extension 34 may be varied.

The elongated lever 32 is pivotally coupled to the clamp body 12 for pivotal movement of the handle 14 relative thereto about a handle-movement pivot axis 44 that lies parallel to the handle-extension pivot axis 36, and thus perpendicularly transverse to the longitudinal axis 38 of the elongated lever 32. This handle-movement pivot axis 44 is defined by a handle-supporting pivot pin 46 that penetrates through the elongated lever 32 and through the two neighbouring sidewalls 22A, 22B of the channel-like upper portion 20 of the clamp body 12. The handle-supporting pivot pin 46 resides at a position situated elevationally above the floor 24 of the clamp body 12, and longitudinally intermediate of the clamp body's proximal and distal ends 12A, 12B. In the illustrated example, the handle-supporting pivot pin 46 more specifically resides above the intermediate floor section 24B of the clamp body 12 at a location nearer to the proximal ends 12A, 32A of the clamp body and elongated lever, than to the distal end 12B of the clamp body.

In the illustrated embodiment, the friction member 16 is also pivotally coupled to the clamp body 12, and is pivotable about a friction member pivot axis 48 that lies parallel to both the handle-extension pivot axis 36 and handle-movement pivot axis 44. This friction member pivot axis 48 is defined by a friction member pivot pin 50 that penetrates through the friction member 16 and through the two sidewalls 22A, 22B of the channel-like upper portion 20 of the clamp body 12. More specifically, the friction member pivot pin 50 resides near the distal end 12B of the clamp body 12 and across the elongated lever 32 from the attachment point through-bore 30 of the clamp body's lower portion 28. In the illustrated example, the friction member pivot pin 50 penetrates the side walls 22A, 22B at lobed upper areas thereof where a height of the two sidewalls 22A, 22B is at its maximum, and thus protrudes upwardly from a remaining fraction of the two sidewalls. Placement of the friction member pivot pin 50 high up on the sidewalls 22A, 22B near the uppermost limits thereof serves to leave sufficient clearance space between the friction member 16 and the floor 24 of the clamp body 12 to accommodate upward and downward pivotal movement of the handle 14, and routing of the rope between the friction member 16 and the handle 14, as described in more detail below.

The friction member 16 has a support end 16A adjacent to which it is supported on the clamp body 12 by the friction member pivot pin 50, and an opposing free end 16B that lies opposite the support end 16A on an elongation axis 52, which denotes a direction in which the friction member's shape is elongated relative to its other two dimensions. This elongation axis 52 and the corresponding elongated dimension of the friction member 16 are of radial relation to the friction member pivot axis 48. Of the other two dimensions of the friction member 16, its width is measured parallel to pivot axis 48, and its thickness is measured perpendicularly transverse to both the elongation axis 52 and the friction member pivot axis 48.

For routing of the rope 18 on a serpentine path through the descender 10, so as to provide frictional resistance to gravitational sliding of the descender down the rope 18, the frictional member 16 and the elongated lever 32 of the handle 14 each have a respective set of rope passages penetrating therethrough so that the rope can be routed along the respective component in a winding manner back-and-forth through these passages.

The friction member 16 has a first such set of rope passages 53A, 53B disposed in series with one another along the elongation axis 52 between the supported and free ends 16A, 16B of the friction member. Each rope passage 53A, 53B penetrates fully through the friction member 16 in the thickness dimension thereof. In the illustrated example, the friction member 16 has two such rope passages 53A, 53B, though the quantity may vary in other embodiments. FIGS. 1 to 6 show the friction member 16 in an upstanding orientation from the friction member pivot pin 50, which reflects a typical deployed position in which the friction member 16 would normally reside during use of the descender 10. However, the friction member 16 can also be pivoted about the friction member pivot axis 48 into a collapsed position folded down over the elongated lever 32 of the handle 14, thus helping to collapse the overall size of the descender for compact stowage between uses. This is shown in FIG. 7, where the handle extension 34 is folded down atop of the handle lever's distal portion, while the friction member 16 is folded down atop the handle lever's proximal portion. Referring to the friction member's deployed position in FIGS. 1 to 6, the two rope passages 53A, 53B of the friction member 16 are referred to as a lower rope passage 53A situated nearest the supported end 16A of the friction member, and an upper rope passage 53B situated nearest the free end 16B of the friction member.

The handle's elongated lever 32 has a second set of rope passages 54A-54E likewise disposed in series with one another along the lever's longitudinal axis 38. Each rope passage 54A-54E penetrates fully through the elongated lever 32 from a topside of the elongated lever 32 to opposing underside, thus spanning a full height or thickness dimension of the elongated lever 32 that lies orthogonally of its other two dimensions. Of those other two dimensions of the elongated lever 32, its length is measured along the longitudinal axis 38, and its width is measured along the handle-movement pivot axis 44. Of the elongated lever's rope passages 54A-54E, one resides at a proximal portion of the elongated lever between the handle-supporting pivot pin 46 and the proximal end 32A of the elongated lever, and so this particular rope passage is referred to as a proximal rope passage 54A. A plural remainder of the rope passages 54B-54E instead reside at a distal portion of the elongated lever between the handle-supporting pivot pin 46 and the distal end 32B of the elongated lever, and so these rope passages 54B-54E are referred to a distal subset of the lever's rope passages. Though the distal subset has four rope passages in the illustrated embodiment, the subset may vary in size to a greater or lesser quantity of rope passages. Of the distal subset of rope passages 54B-54E, the rope passage furthest from the proximal rope passage 54A, and thus nearest to the distal end 32B of the elongated lever, is referred to as a distalmost rope passage 54E.

In the illustrated embodiment, the friction member 16 is of solid one-piece block-like construction, as is the part of the elongated lever 32 that is penetrated and supported by the handle-supporting pivot pin 46 and that contains the elongated lever's respective set of rope passages 54A-54E. Both sets of rope passages are therefore embodied by through-bores penetrating through the otherwise-solid block of material through which the rope is to be wound on a serpentine path. However, it will be appreciated that that other constructions may be employed to achieve an elongated component with rope passages through which the rope can be wound back and forth on a serpentine path. One alternative example could be constructed from two parallel and horizontally spaced apart rails or bars of elongated shape, which would be interconnected to one another at spaced intervals in the elongated direction thereof by a series of bobbins. In such instance, the open spaces between adjacent bobbins would denote respective rope passages through which the rope can be routed back and forth through the component to take on a serpentine path spanning therealong in wrapping fashion around the bobbins.

Figure 5:
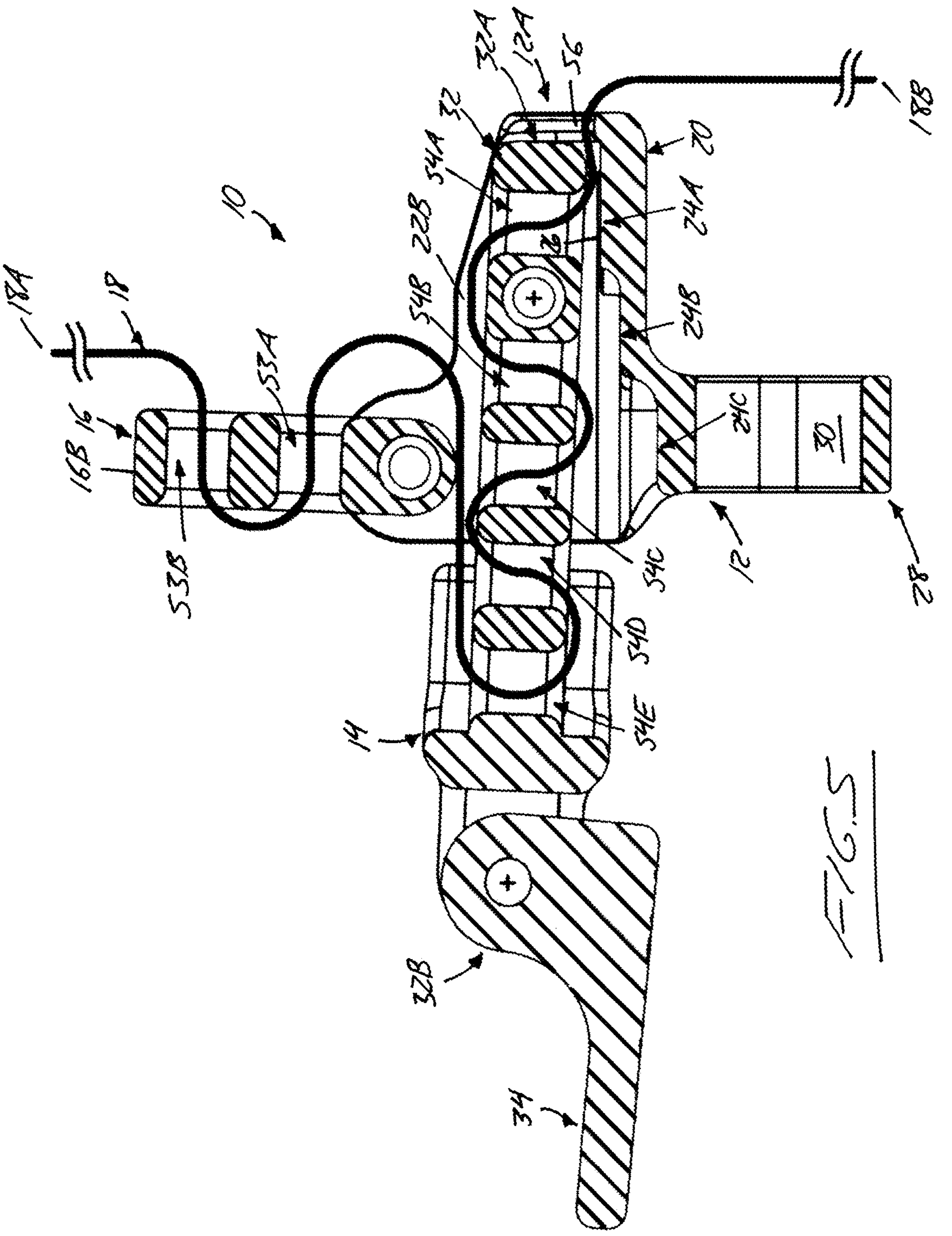
FIG. 5 is a cross-sectional view of the descender of FIG. 4, as viewed along the same cutting plane, but illustrating routing of a rope through the descender in preparation for use.

FIG. 5 illustrates routing of the rope 18 through the descender 10. The rope 18 has anchoring end 18A typically equipped with a hook or other means (not shown) for anchoring the rope to a stable anchoring point from which an opposing free end 18B of the rope 18 can be hung to allow the user to descend down the hanging rope. In a downstream direction from the anchoring end 18A to the hanging end 18B, the rope is routed on a serpentine path through the descender 10 as follows. Using the term "distal direction" to denote a direction toward the distal end 32B of the elongated lever, and "proximal direction" to denote an opposing direction toward the proximal end 32A thereof, first the rope is routed through the upper rope passage 53B of the friction member 16 in the distal direction, then back through the lower rope passage 53A of the friction member 16 in the proximal direction, then around the supported end 16A of the friction member in the distal direction via an open space between the supported end 16A of the friction member and the topside of the elongated lever 32. The rope 18 then continues downward through the distalmost rope passage 54E in the elongated lever 32, and then in alternating upward and downward fashion serially through the remainder of the distal subset of rope passages 54D, 54C, 54B in the elongated lever 32, and finally downward through the proximal rope passage 54A. In the rope's transition between the final two rope passages 54B, 54A of the elongated lever 32, it thus passes overtop of the handle-supporting pivot pin 46. From the bottom of the proximal rope passage 54A, the rope spans under the proximal end 32A of the elongated lever via the space between the clamping surface 26 of the clamp body floor 24 and the underside of the lever's proximal portion. From the proximal end 32A of the elongated lever 32, the rope 18 finally exits the interior space of the clamp body 12 at an open-topped downwardly-tapered V-shaped notch 56 of the clamp body 12. As best shown in FIG. 3, this notch 56 in the clamp body's channel-like upper portion 20 resides in a terminal end wall 58 thereof that joins the two side walls 22A, 22B together at the proximal end 12A of the clamp body. This V-shaped notch 56 defines a final departure point from which the rope exits the descender 10, and from which the free end 18B of the rope hangs.

Figure 6A:
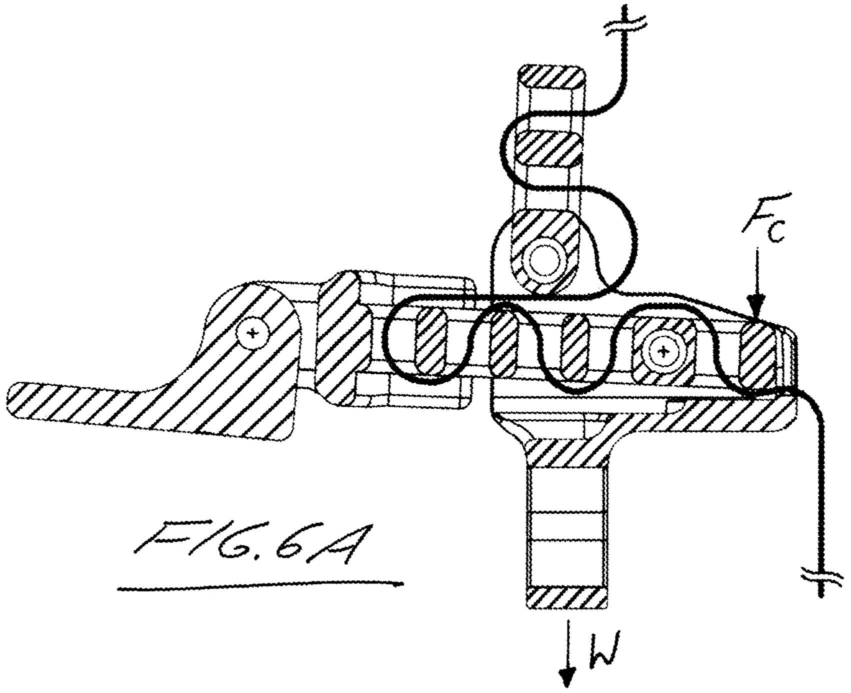
FIG. 6A is another cross-sectional view like that of FIG. 5, but illustrating forces by which by which the descender will self-lock on the rope by default under the user's body weight, absent user performance of a release action on the handle.
Figure 6B:
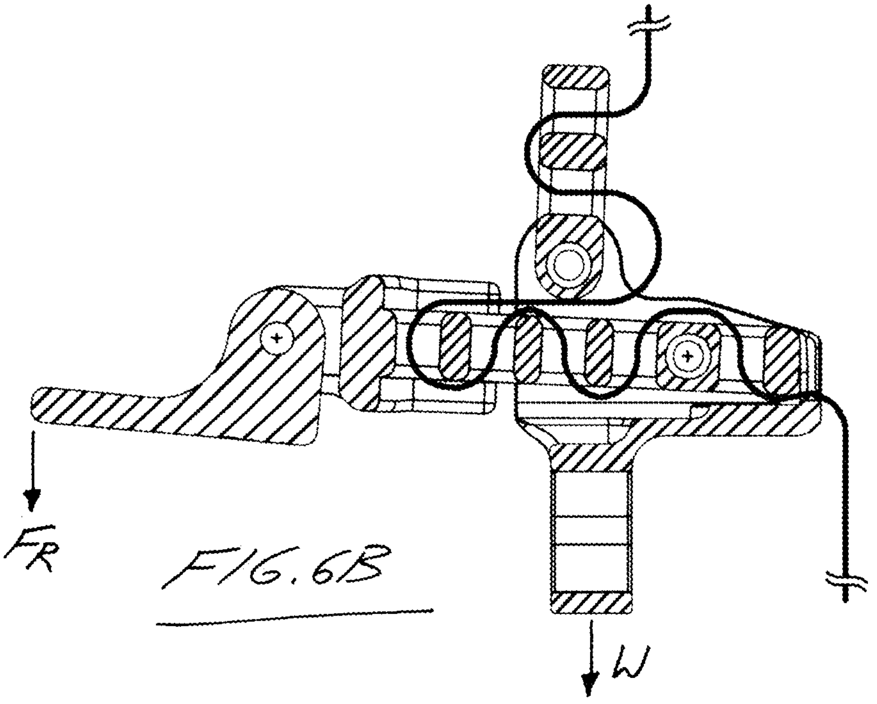
FIG. 6B is another cross-sectional view like that of FIG. 6A, but illustrating performance of the release action on the handle so that the rope slips through the descender, thereby allowing allow descent of the user along the rope.
Figure 7:
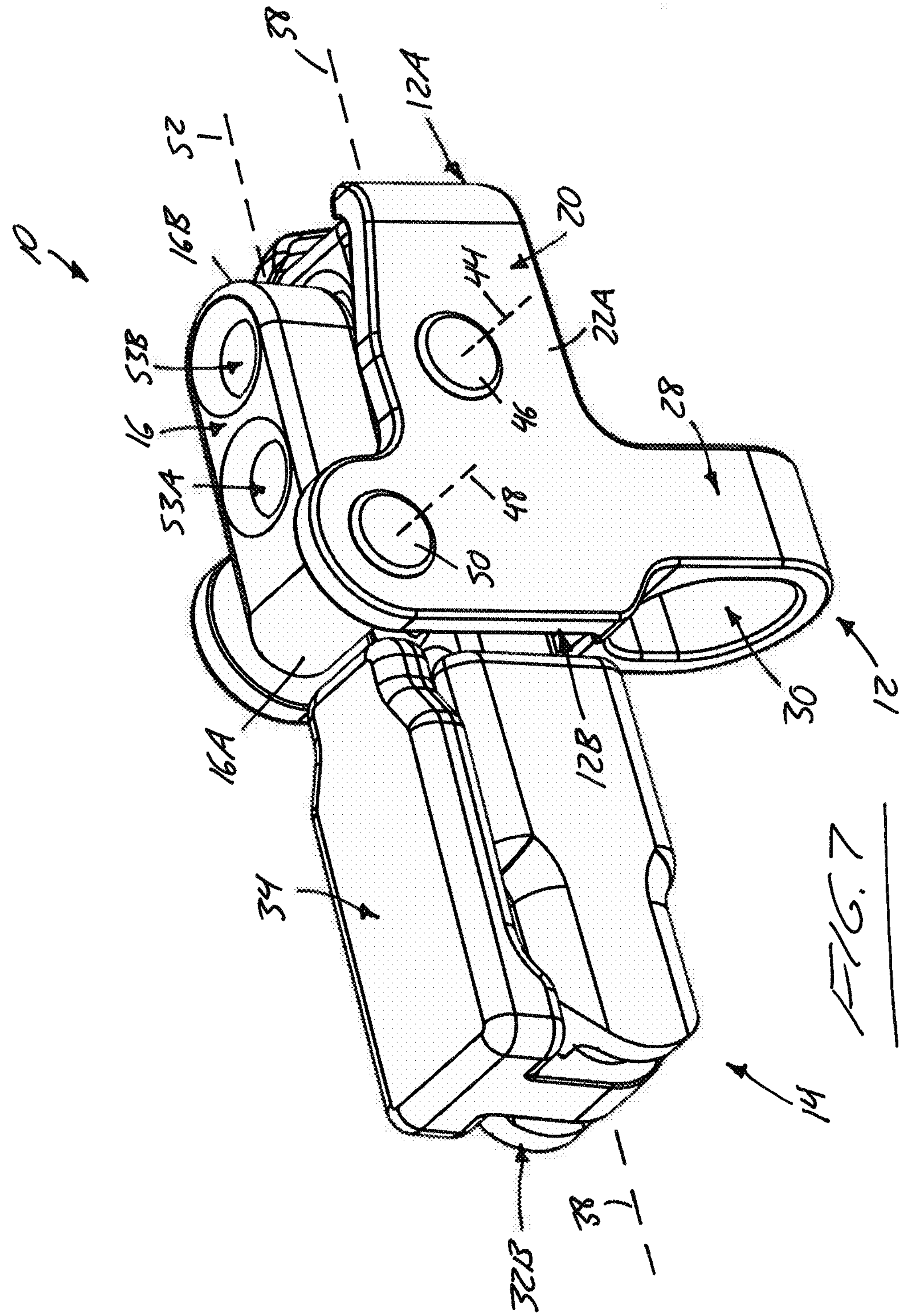
FIG. 7 is another perspective view of the descender of FIG. 1, but in a fully collapsed state for optimal storage compactness between uses.

Having described the structure of the descender 10, and the routing of the rope 18 therethrough to prepare to the descender for use, attention is now turned to use of the descender, as schematically illustrated in FIGS. 6A and 6B. FIG. 6A illustrates how the descender will normally occupy a self-locking state on the rope 18 by default, until such time as a specific release function is performed via user-manipulation of the handle, which is schematically shown in FIG. 6B. Referring initially to FIG. 6A, with the user's body-worn harness or belt (not shown) clipped to the attachment point 30 of the clamp body's lower portion 28, the user's body weight W pulls gravitationally downward thereon. Due to the serpentine winding of the rope 18 through the elongated lever 32, this creates a moment on the elongated lever 32 that forces the proximal end 32A thereof downwardly, thus clamping tightly on the rope 18 at a pinch point between the underside of the lever's proximal portion and the adjacent clamping surface 26 on the floor 24 of the clamp body 12, as schematically shown by clamping force Fc. Under the user's body weight, the descender 10 thus self-locks at a static position on the rope 18 due this clamped state of the rope between the elongated lever 32 and the clamp body 12.

Turning to FIG. 6B, to reduce the clamping force Fc and allow the rope 18 to slip through the descender in controlled fashion to gradually lower the user along the rope, the user grips the handle 14, specifically at the unfolded handle extension 34 in the illustrated example, and pulls downward thereon to exert a release force FR of opposing moment direction to the clamping force Fc. This manually exerted release force FR thus fully or partially counteracts the clamping force, thus allowing the rope 18 to slip through the descender 10, and thereby lowering the user along the rope 18. User control over the amount of exerted release force FR on the handle 14 controls the relative counteraction of the clamping force Fc, thus giving the user a control over the selected rate of descent. Full removal of the release force FR returns the clamping force Fc to its maximum, thereby once again locking the descender 10 in place on the rope 18, thereby terminating the user's descent therealong.

By routing the rope through rope passages not only in the elongated lever 32 of the handle 14, but also in a separate friction member 16, the necessary lever length to accomplish a given number of serpentine windings, and thereby achieve a proportional degree of frictional resistance to rope movement, is reduced. Such reduction of necessary lever length is helpful to reduce the overall size of the descender for optimally compact stowage on the user's person when not in use. Likewise, the inclusion of a movable handle extension 34 selectively deployable into a working position from a stowed position of less protrusive character contributes to such footprint reduction for compact stowage, as does the movable character of the pivotally coupled friction member 16 than can be selectively folded down atop the lever 32 for compact stowage.

It will be appreciated however that the inclusion of the supplemental rope passages 53A, 53B carried independently of the lever 32 may be employed to useful benefit, regardless of whether those supplemental rope passages 53A, 53B are formed in a movable friction member 16 pivotally coupled to the clamp body 12, instead formed in a portion of the clamp body 12 itself, or alternatively formed in a static friction member that is rigidly fixed the clamp body 12 in an immovable manner. The inclusion of such supplemental rope passages can also be employed to useful benefit regardless of whether the handle 14 includes a movable extension 34. When a separate and movable friction member 16 is employed, another benefit thereof aside from its collapsibility when not in use is that the pivotal coupling of the friction member 16 allows its orientation relative to the clamp body 12 to vary to some degree, thus helping ensure that the rope's initial entry point to the descender remains at the top of the device, despite minor variations in the clamp body's orientation when used in its attached condition to the user's belt or harness. It will also be appreciated that the novel inclusion of a movable handle extension 34 may be employed regardless of the inclusion or omission of supplemental rope passages beyond those found in the handle lever itself.

Another notable and novel feature of the illustrated embodiment is the inclusion of the tapered V-notch 56, and its strategic placement adjacent to the clamping surface 26 in an orientation in which its tapered shape grows narrower toward that clamping surface 26 on the clamp body floor 24. This way, the downward displacement of the rope 18 by the proximal portion of the handle lever 32 during the initial lowering thereof under the user's body weight forces the rope 18 into the narrower region at the bottom of the V-notch 56, thus introducing some frictional resistance to the rope's relative movement through the descender 10 before the actual clamping of the rope 18 takes place between the clamping surface 26 and the handle lever 32. In summary of the preferred embodiment shown in the drawings, a highly compact, self-locking escape descent control device (EDCD) is achieved. Through testing of prototypes, the device has been found compatible with extremely small rope diameters (4-6 mm). Logarithmic reduction in rope tension occurs every time the rope is bent and unbent. With extremely small diameter ropes (which tend to flatten easily under compression), successful effectuation of rope locking through a clamping action requires that rope tension be sufficiently reduced at the point of clamping, such the clamping force itself does not cut the not-very-many-fibres in the small rope. This challenge is exacerbated with very supple, ultra small diameter ropes. Stiff ropes result in substantially greater tension loss when bent and unbent around features for friction purposes. For these ultra small diameter, supple ropes, it is the quantity of holes as well as the magnitude of direction changes that provide the required tension loss for effective rope clamping. So in the present invention, rather than using a separate type of cam to lock the rope, the moment created by the rope being threaded through the handle in serpentine fashion is used to create the clamping force against the main clamp body, to which the user is connected by a sling, snap link or carabiner. Starting at the anchored end, the rope is threaded first through the unique friction member, which removes some of the rope tension before it is threaded further through the rope passages in the handle. The friction member also helps maintain rope alignment into the device regardless of the device orientation.

Device compactness and 'tuning' of the rope locking function is gained by first utilizing the pivoting friction member, then routing the rope towards the distal part of the handle that is gripped during use, then redirecting the rope in the proximal direction in serpentine winding fashion through the rope passages in the handle lever, whose pivotal mounting enables its use as a moment arm to clamp the rope under the proximal end of the handle. To prevent the rope from bunching at the clamping point, the rope passes through a V-notch which also provides additional friction before it is clamped. This combination of features provides sufficient force reduction to the rope before it is clamped by the locked state of the device, helping enable use of extremely small diameter ropes. More conventional types of descenders have high clamping forces which would either cut or seriously damage such small diameter ropes. One-handed descent control is achievable with this configuration, whereas other devices require one hand on the handle and use of the other hand to grip the infeed rope to control rate of descent and prevent free-fall.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A self-locking descent control device for controlled descent of a user along a rope, said device comprising:

a clamp body;

a control handle comprising an elongated lever having a proximal end and an opposing distal end spaced apart on a longitudinal axis of said elongated lever, said elongated lever being pivotally coupled to the clamp body at a pivot point near the proximal end of the lever;

an attachment point carried on the clamp body and configured for connection thereof to body-worn equipment of the user for the purpose of bearing a body weight of the user on the rope when the device is in a locked condition;

a friction arrangement carried on the clamp body at a location across the elongated lever from the attachment point, and comprising a first set of one or more rope passages through which the rope is routable;

a second set of rope passages opening through said elongated lever and laid out in series with one another along said longitudinal axis, said second set of rope passages comprising a proximal rope passage residing at a proximal portion of the lever between the proximal end thereof and the pivot point, and a distal subset of rope passages residing at a distal portion of the lever between the distal end thereof and the pivot point; and a clamping surface on the clamping body that is positioned adjacent the proximal portion of the elongated lever on the same side thereof as the attachment point;

wherein the rope is routable on a serpentine path through the first set of one or more rope passages, and onward therefrom through the second set of rope passages, from the proximal rope passage of which the rope passes through a space between the proximal portion of the elongated lever and the clamping surface to achieve automatic clamping of the rope therebetween under the body of weight of the user, thereby placing said device in said locked condition.

2. The device of claim 1 wherein the friction arrangement, at least in a working state of the device, overlies the distal portion of the elongated lever of the control handle.

3. The device of claim 1 wherein first set of rope passages at the friction arrangement are defined in a friction member that is movably coupled to the clamp body, separately of the control handle.

4. The device of claim 3 wherein the friction member is pivotally coupled to the clamp body.

5. The device of claim 4 wherein the friction member is pivotally coupled to the clamp body at a location that, along the longitudinal axis of the elongated lever, resides between the pivot point and the distal end of the elongated lever.

6. The device of claim 3 wherein the friction member is movable between a deployed position for use, and a collapsed position for compact stowage between uses.

7. The device of claim 6 wherein the friction member folds down over the elongated lever of the control handle in the collapsed position.

8. The device of claim 1 wherein the handle further comprises a movable extension coupled to the elongated lever and movable relative thereto between a working position extending an effective length of the control handle for use, and a stowed position reducing the effective length of the control handle for compact stowage between uses.

9. The device of claim 1 wherein the clamp body comprises a tapered notch situated proximate to both the clamping surface and the proximal portion of the elongated lever, said tapered notch defining a departure point through which the rope exits the clamp body, and at which the rope is wedged into a narrowed region of the tapered notch when clamped by the proximal portion of the elongated lever.

10. The device of claim 1 in combination with the rope, wherein the rope resides in an installed state routed through the serpentine path, starting at the first set of one or more rope passages, and onward therefrom serially through the second set of rope passages, starting from a distalmost rope passage furthest from the proximal rope passage, and onward from said distalmost rope passage to and through the proximal rope passage.

11. The combination of claim 10 wherein the serpentine path of the rope passes over the pivot point on a side thereof opposite the clamping surface, and descends downwardly through the proximal rope passage into to the space between the clamping surface and the proximal portion of the elongated lever.

12. A self-locking descent control device for controlled descent of a user along a rope, said device comprising:

a clamp body;

a control handle comprising an elongated lever having a proximal end and an opposing distal end spaced apart on a longitudinal axis of said elongated lever, said elongated lever being pivotally coupled to the clamp body at a pivot point near the proximal end of the lever;

an attachment point carried on the clamp body and configured for connection thereof to body-worn equipment of the user for the purpose of bearing a body weight of the user on the rope when the device is in a locked condition;

a set of rope passages opening through said elongated lever and laid out in series with one another along said longitudinal axis, said set of rope passages comprising a proximal rope passage residing at a proximal portion of the lever between the proximal end thereof and the pivot point, and a distal subset of rope passages residing at a distal portion of the lever between the distal end thereof and the pivot point; and a clamping surface on the clamping body that is positioned adjacent the proximal portion of the elongated lever on the same side thereof as the attachment point, whereby the rope is routable on a serpentine path through the set of rope passages, and onward from the proximal rope passage thereof through a space between the proximal portion of the elongated lever and the clamping surface to achieve automatic clamping of the rope therebetween under the body of weight of the user, thereby placing said device in said locked condition;

wherein the clamp body comprises a tapered notch situated proximate to both the clamping surface and the proximal portion of the elongated lever to define a departure point through which the rope exits the clamp body, and at which the rope is wedged into a narrowed region of the tapered notch when clamped by the proximal portion of the elongated lever.

13. The device of claim 12 in combination with the rope, wherein the rope resides in an installed condition routed through the serpentine path, and therein winds serially through the set of rope passages in the elongated lever, starting from a distalmost rope passage furthest form the proximal rope passage, and serially onward from said distalmost rope passage to and through the proximal rope passage.

14. The combination of claim 13 wherein the serpentine path of the rope passes over the pivot point on a side thereof opposite the clamping surface, and descends downwardly through the proximal rope passage to the space between the clamping surface and the proximal portion of the elongated lever, and continues therefrom past the proximal end of the elongated lever and through the tapered notch.

15. A self-locking descent control device for controlled descent of a user along a rope, said device comprising:

a clamp body;

a control handle comprising an elongated lever having a proximal end and an opposing distal end spaced apart on a longitudinal axis of said elongated lever, said elongated lever being pivotally coupled to the clamp body at a pivot point near the proximal end of the lever;

an attachment point carried on the clamp body and configured for connection thereof to body-worn equipment of the user for the purpose of bearing a body weight of the user on the rope when the device is in a locked condition;

a set of rope passages opening through said elongated lever and laid out in series with one another along said longitudinal axis, said set of rope passages comprising a proximal rope passage residing at a proximal portion of the lever between the proximal end thereof and the pivot point, and a distal subset of rope passages residing at a distal portion of the lever between the distal end thereof and the pivot point; and a clamping surface on the clamping body that is positioned adjacent the proximal portion of the elongated lever on the same side thereof as the attachment point, whereby the rope is routable on a serpentine path through the set of rope passages, and onward from the proximal rope passage thereof through a space between the proximal portion of the elongated lever and the clamping surface to achieve automatic clamping of the rope therebetween under the body of weight of the user, thereby placing said device in said locked condition;

wherein the handle further comprises a movable extension coupled to the elongated lever and movable relative thereto between a working position extending an effective length of the control handle for use, and a stowed position reducing the effective length of the control handle for compact stowage between uses.

* * * * *